May 19, 1936. J. ORGERON 2,040,873
TRAP
Filed Dec. 11, 1934
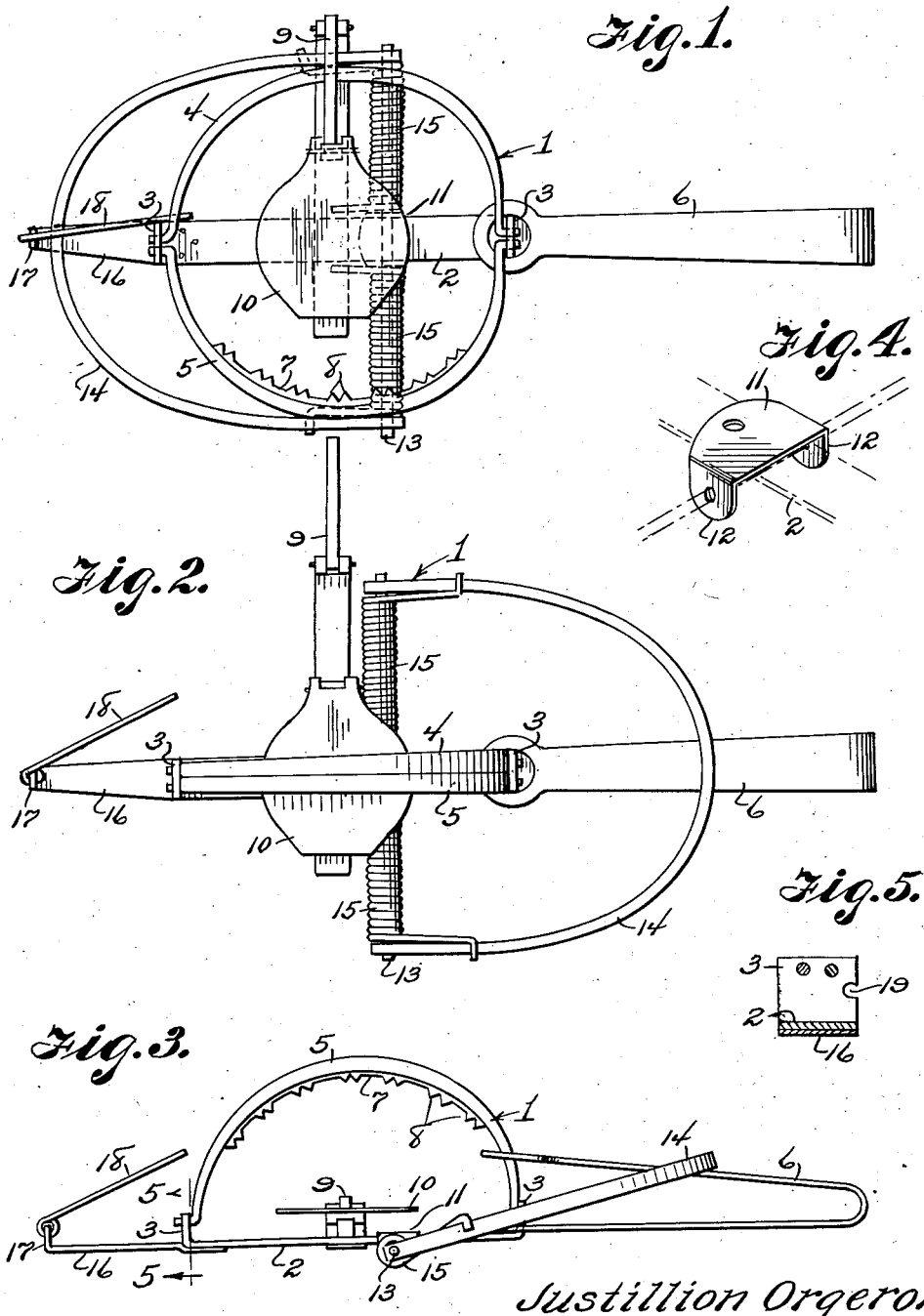
Justillion Orgeron
INVENTOR
BY Victor J. Evans & Co.
ATTORNEY Patented May 19, 1936

2,040,873

UNITED STATES PATENT OFFICE 2,040,873

TRAP

Justillion Orgeron, Larose, La.

Application December 11, 1934, Serial No. 757,031

1 Claim. (Cl. 43—96)

This invention relates to animal traps and more particularly to a device especially adaptable for use in conjunction with a spring actuated jaw trap for striking an animal caught in a trap a blow to bring about quick or sudden death without liability of injuring the animal's pelt, and has for the primary object the provision of a device of the above stated character which will be simple and durable in construction and which may be applied to a trap without undue alterations thereto and will not interfere with the latter's operation or render the same bulky or clumsy as to interfere with the setting and successful operation thereof.

With these and other objects in view this invention consists in certain novel feautres of construction, combination and arrangement of parts to be hereinafter more fully described and claimed.

For a complete understanding of my invention, reference is to be had to the following description and accompanying drawing, in which Figure 1 is a top plan view illustrating my invention adapted to a jaw trap, the latter being shown in a set position.

Figure 2 is a top plan view illustrating the trap in a released position.

Figure 3 is a side elevation illustrating the device.

Figure 4 is a fragmentary perspective view illustrating a clip employed for mounting the striker of my invention to the trap.

Figure 5 is a detail sectional view taken on the line 5—5 of Figure 3.

Referring in detail to the drawing, the numeral 1 indicates in entirety a spring actuated jaw trap to which my invention is adapted and consists of a base element 2 provided with upturned apertured ends 3 to pivotally support the ends of jaws 4 and 5 which are normally urged towards one another or gripping position by a spring or tension member 6. One of the jaws has suitably secured thereto a plate 7 equipped with closely related teeth 8 to aid the jaws in obtaining a firm hold upon an animal. The jaws 4 and 5 are held in a spread or set position by a pivoted catch 9 engageable with a treadle 10. The foregoing description sets forth briefly a type of jaw trap to which my invention is readily adaptable without undue alterations thereto or without materially increasing its size and cost of manufacture.

A clip 11 is suitably secured to the member 2 of the trap and includes spaced apertured ears 12 which receive a shaft 13 so as to support the shaft transversely of the trap with its ends terminating outwardly of the jaws when in set position. The ends of the shaft form journals for an arcuately curved striker 14. Coil springs 15 are mounted on the shaft with their adjacent ends suitably fixed to the trap and having their outer ends in engagement with the striker to act to swing the striker with considerable force in the direction of and against the tension member 6 of the trap.

An extension 16 is suitably secured to one end of the member 2 of the trap and has an upstanding apertured end 17 to which is hinged one end of a latch element 18 and the latter due to its connection with the extension is capable of having a limited lateral movement of the extension. One of the upturned ends 3 of the member 2 of the trap is provided with a notch 19 to receive the latch element 18 for holding the striker in a set position or against the extension prior to the setting of the jaws 4 and 5 and after said jaws have been set, the latch element is disengaged from the notch 19 and placed under the jaw 4 still retaining the striker in a set position so that on the release of the jaws by the animal stepping on or engaging the treadle 10 the striker 14 is released and driven in a semicircular path over the jaws which grip the animal so as to strike the animal with force sufficient to bring about quick or sudden death. The curvature of the striker is such that it will permit said striker to move freely over the jaws when the latter are in clamping or gripping position and at such a distance from the jaws that the striker will hit or contact with a portion of the head of the animal for bringing about death to the animal without danger of marring or injuring the animal's pelt.

Having described the invention, I claim:

In an attachment for a trap which comprises a flat base element formed with upturned ends, cooperating arcuate jaws having pivotal mountings in said ends, a flat spring yieldingly impelling the jaws into gripping position and extending in the direction of the length of the base and a treadle controlled catch engageable with one of the jaws to retain the two in open position against the pressure of the spring; the said attachment comprising an arcuate striker member of greater spread than the jaws, a shaft with whose extremities the extremities of the striker member are engaged to provide a pivotal mounting for the striker member, a clip formed with down-turned apertured ears, the clip being disposed in straddling relation to the base with the ears in substantially abutting relation to the base on opposite edges, the shaft extending through the ears but below the base to dispose the axis of movement of the striker member rightangularly to the axes of movement of the trap jaws, coil springs encircling the shaft on opposite sides of the clip and having their extremities engaged respectively with the clip and with the striker member, and an auxiliary latch member mounted on the base at the end remote from the jaw actuating spring to initially retain the striker member in a plane parallel to the plane of the base against the torsion of said coil springs, the striker member in such position being restrained by the treadle controlled catch when engaged with one of the jaws in the open position of the latter.

JUSTILLION ORGERON.